United States Patent [19]

Orpana

[11] 4,043,417
[45] Aug. 23, 1977

[54] TRACKED VEHICLE SUSPENSION SYSTEMS

[75] Inventor: Robert J. Orpana, Ste. Foy, Canada

[73] Assignee: Panatrac Manufacturing Corporation Limited, Toronto, Canada

[21] Appl. No.: 694,103

[22] Filed: June 9, 1976

[51] Int. Cl.² .................. B60G 11/22; B62D 55/00
[52] U.S. Cl. .................. 180/9.54; 267/57.1 R; 280/717
[58] Field of Search .......... 280/717, 716; 180/9.54, 180/5 R; 267/21, 57.1 R, 57.1 A

[56] References Cited

U.S. PATENT DOCUMENTS

| 2,729,442 | 1/1956 | Neidhart | 267/57.1 R X |
| 3,923,111 | 12/1975 | Purcell | 180/9.54 |

Primary Examiner—Philip Goodman
Attorney, Agent, or Firm—Rogers, Bereskin & Parr

[57] ABSTRACT

A tracked vehicle suspension system employing torsion cells is described. Road wheels of the vehicle are supported by negative rake suspension arms, each coupled to the chassis of the vehicle by a torsion cell. An improved torsion cell is also described.

10 Claims, 7 Drawing Figures

TRACKED VEHICLE SUSPENSION SYSTEMS

This invention relates to a suspension system for a tracked vehicle, and to a torsion cell capable of being used, for example, in such a system.

Tracked vehicle suspension systems employing torsion cells are known. An example of such a system is shown in U.S. Pat. No. 2,779,636. Prior art systems suffer serious disadvantages because of the severe stresses which are generated in the torsion cells in use. Particularly severe stresses occur as a result of the high shock loads to which a tracked vehicle is subjected when traversing rough terrain. Premature failure of the torsion cells in a tracked vehicle suspension system is common for these reasons.

Relatively complex suspension systems employing multiple torsion cell arrangements have been evolved in attempting to accommodate the stresses referred to above. For example, in the system disclosed in the above-mentioned Patent, four torsion cells are used for each ground wheel of the vehicle. Multiple cell arrangements make for extra expense in manufacture and maintenance. Also, such systems require the vehicle to have a relatively high ground clearance.

Prior art torsion cells themselves suffer disadvantages which lead to premature failure. Referring again to U.S. Pat. No. 2,779,636 by way of example, the torsion cells disclosed in that Patent employ rubber cylinders as the torsion medium. These cylinders would, in use, be subjected to severe compressive stresses which would probably lead to premature failure of the cell in normal use in a tracked vehicle.

An object of the present invention is to provide a tracked vehicle having an improved suspension system. A further aim is to provide an improved torsion cell.

According to one aspect of the invention, there is provided a tracked vehicle having a suspension system. The vehicle includes a chassis supporting a power unit and two track assemblies disposed at respectively opposite sides of the chassis. Each assembly includes an endless track, means for guiding the track in a closed path including a lower portion along which the track runs in contact with the ground, means driveably coupling the power unit and the track for driving the track in said path to propel the vehicle, and a plurality of ground wheels rotatable about axes normal to the direction of vehicle movement and arranged in rolling contact with the track along said ground-contacting portion of its path.

The suspension system includes, in association with each track assembly, a plurality of suspension arms, each rotatably supporting one of said ground wheels, and a corresponding plurality of torsion cells, each coupling one of said arms to said chassis. Each torsion cell includes an inner member having an outer surface which is of non-circular shape and which extends about a longitudinal axis of the member. An outer member extends around the inner member and has an inner surface which is of non-circular shape and which extends about said longitudinal axis. A resilient elastomeric material is disposed in the space between the members and torsionally couples the members. A plurality of elongate elements extend longitudinally of and are spaced equally about said outer surface of the inner member of the cell. These elements mechanically key the inner member to the elastomeric material and provide, on said inner member, spaced stress-distribution surfaces tending to equalize throughout the elastomeric material, stresses produced in said material in response to relative turning movement between the inner and outer members of the cell in use. Each torsion cell in the system is coupled to the chassis of the vehicle by either its inner member or its outer member so that the longitudinal axis of the cell extends parallel to the axis of rotation of the associated wheel. The other member of the cell is coupled to the relevant wheel suspension arm so that the arm defines an obtuse angle with respect to the direction of vehicle movement. In use, vertical displacement of a ground wheel as the vehicle travels over obstructions, causes relative turning movement between said inner and outer members of the associated torsion cell and torsionally stresses and elastomeric material of the cell.

According to another aspect of the invention, there is provided a torsion cell which includes an inner tubular member having an outer surface which is of non-circular shape and which extends about a longitudinal axis of the member, and an outer tubular member having an inner surface which is of non-circular shape and which extends about said longitudinal axis. The outer member extends around the inner member to define a space between the members. A resilient elastomeric material is disposed in the said space and torsionally couples the members. A plurality of elongate elements extend longitudinally of and are spaced equally about the outer surface of the inner member of the cell to mechanically key the inner member to the elastomeric material and provide, on said inner member, spaced stress-distribution surfaces tending to equalize throughout the elastomeric material, stresses produced in said material in response to relative turning movement between said inner and outer members when the cell is in use.

The invention will be better understood by reference to the accompanying drawings, in which.

Figure 1:
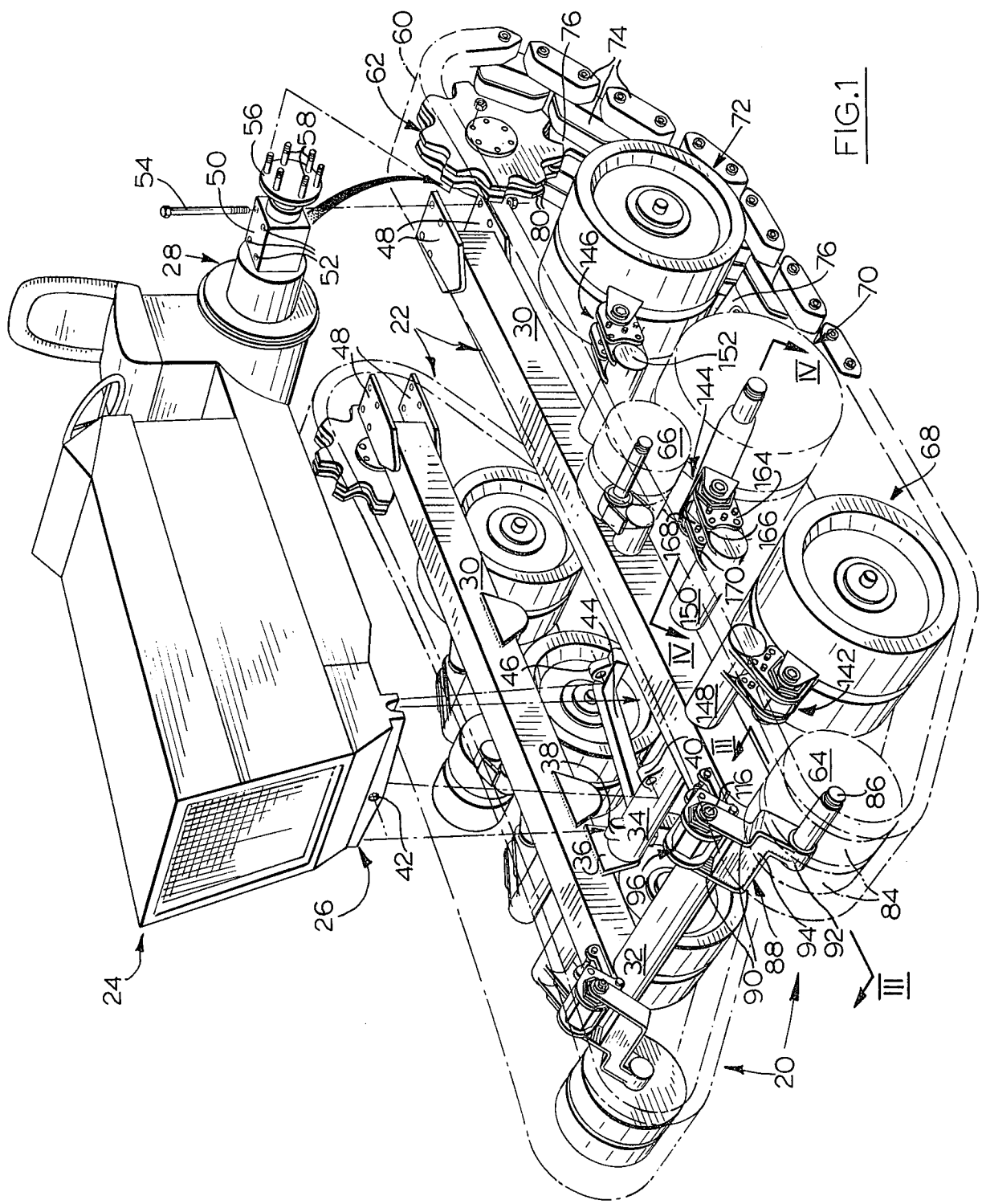
FIG. 1 is a partly exploded perspective view of a tracked vehicle having a suspension system according to the invention.

Referring first to FIG. 1, the vehicle includes two track assemblies 20 carried by a chassis frame 22 designed to support a power unit 24 for driving the vehicle. Unit 24 is shown in an exploded position in FIG. 1 for clarity of illustration; the unit is normally mounted on the chassis frame 22 as indicated by the chain dotted arrows. Although the power unit 24 may take many forms, in the particular embodiment illustrated, a conventional farm tractor power unit is employed and has a front mounting 26 which is supported on the chassis frame 22, and a rear axle 28, the casing of which is coupled to the chassis frame to support the rear end of the power unit.

Chassis frame 22 includes two parallel longitudinal members 30 of box section which are joined at the forward end by two transverse tubular members 32 and 34. Members 34 is attached to the longitudinal members 30 by depending lugs 36 (only one of which is visible)

welded to the member 34 and to the longitudinal members 30. Member 34 also has two upwardly directed formations 38 (only one of which is visible) which engage in the forward power plant mounting 26 for location purposes and a central lug 40 formed with an aperture which aligns with a corresponding aperture 42 in mounting 26 to receive a bolt for coupling the power unit 24 to member 34. A pair of inwardly angled arms 44 extend rearwardly from member 34 and are joined at their inner ends to form an additional attachment point for the power unit. An upwardly directed apertured lug 46 at the junction between these arms aligns with a second aperture (not visible) in the underside of the power unit for receiving a second attachment bolt.

Each longitudinal chassis member 30 has at its rearward end a pair of parallel horizontal plates 48 for attaching the rear axle 28 of the power unit 24 to the chassis frame 22. Adjacent each of its outer ends, the rear axle 28 is formed with a portion which is of generally square shape in transverse vertical cross-section. The squared portion at one end of axle 28 is visible at 50; the other portion (not visible) is similar. The plates 48 in each pair are vertically spaced by an amount such that the relevant squared portion 50 on the rear axle closely fits between the plates. Each portion 50 is held in place by four bolts, one of which is indicated at 54, passing through four aligned holes in the plates 48 and portion 50.

At each end, axle 28 has a driving flange 56 provided with a series of outwardly projecting studs 58 by which the flange is drivably coupled with the driving sprocket assembly (see later) of the relevant track assembly 20.

Figure 2:
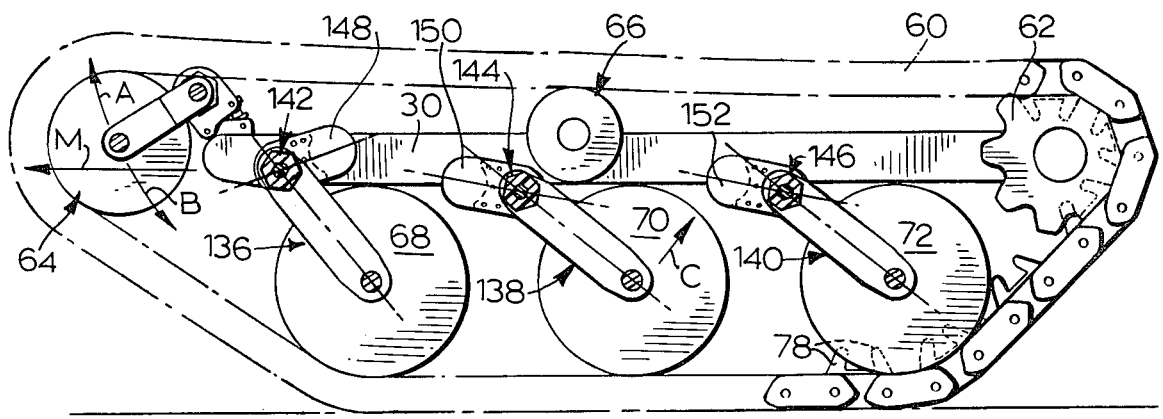
FIG. 2 is a side view corresponding to FIG. 1, with the power unit of the vehicle omitted.

For convenience, the description which follows will refer only to the track assembly which is visible in the foreground of FIG. 1 and in FIG. 2 (the left hand track assembly-considered when viewed in the direction of vehicle motion). The other track assembly comprises the same components arranged in an opposite-handed configuration. Each track assembly includes an endless track 60 which extends around a driving sprocket assembly 62 adjacent the rear end of the vehicle and an idler wheel 64 adjacent the front end of the vehicle. The upper run of the track between sprocket assembly 62 and idler wheel 64 is supported by an intermediate idler wheel 66. Three ground wheels 68, 70 and 72 are suspended from the chassis frame and bear on the lower run of the track.

The tracks 60 are each of segmented modular form. The track construction is more specifically described, for example, in U.S. Pat. applications Ser. Nos. 594,138, 594,139, 594,140 and 594,141, all filed July 7, 1975. Briefly, each track comprises a plurality of traction modules 74 and a plurality of guiding modules 76. The guiding modules are arranged in a row centrally of the track and the traction modules are disposed symmetrically in rows on opposite sides of the row of guiding modules. The modules are coupled to one another for pivotal movement about axes extending transversely of the track and the arrangement is such that each module has two associated pivot axes arranged adjacent respectively opposite ends of the module. The pivot axes are defined by transverse, hexagonal rods received in resilient bushes in the modules. The traction modules are made predominantly of elastomeric material which allows controlled resilient deformation of the modules when the track is in use. As a result of this material and of the resilient the track has a "forgiving" character.

Figure 5:
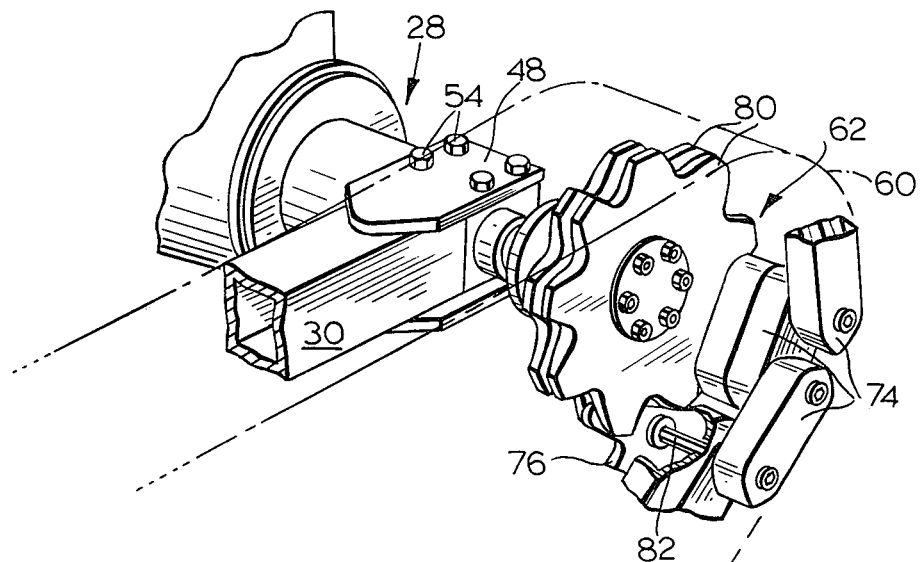
FIG. 5 is a perspective view of one of the track driving sprockets of the vehicle.

Each track driving sprocket assembly 62 (see FIG. 5) comprises two similar sprockets 80 bolted to the relevant driving flange 56 of the power unit rear axle 28 and spaced from one another by an amount such that the guiding formations 78 of the guiding modules pass between the two sprockets 80. In this way, the track is located laterally with respect to the sprockets. The track is driven by engagement of the sprockets 80 with the guiding modules 76. The sprockets engage two laterally projecting cylindrical formations disposed on respective sides of each module at the position of the pivot shaft connecting the module with adjacent modules in the track.

Figures 3, 4:
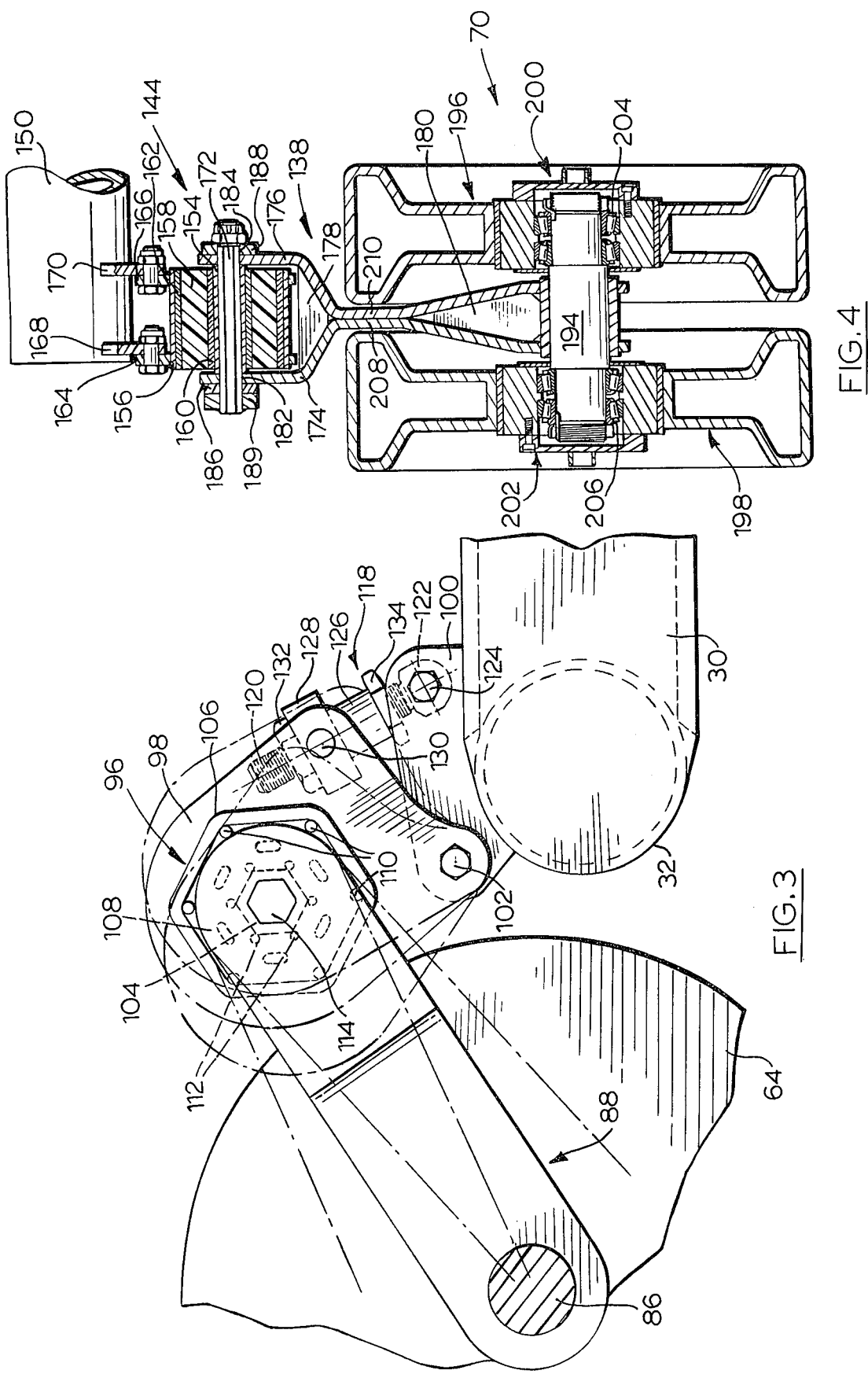
FIG. 3 and 4 are sectional views on lines III—III and IV—IV of FIG. 1 respectively.

Guidance of the track if effected by the row of track guiding modules, in co-operation with the idler wheels 64 and 66 and the ground wheels 68,70 and 72. For this reason, each of these wheels is formed by two similar wheel sections spaced from one another on the same axis of rotation. The spacing between the two wheels is such that the guiding formations 78 of the guiding modules pass closely between each two wheel sections and guide on the opposed inner surfaces thereof. By way of example, FIG. 4 shows ground wheel 70 as comprising two similar wheel sections arranged at a spacing from one another as will be more specifically described hereinafter.

The front track idler 64 comprises two wheel sections 84 which are mounted at a spacing from one another on a cantilever stub axle 86. Idler 64 is adjustable (as will be described) generally towards and away from the adjacent ground wheeld 68 so as to vary the tension in the track. This form of idler is normally referred to as a compensating idler assembly. In any event, the two wheel sections 84 are mounted at a spacing from one another on a stub axle 86 which projects laterally from a fulcrum arm 88. Arm 88 comprises two cranked plates 90 welded to a sleeve 92 which receives the stub axle 86. Bearings (not shown) inside the wheel sections 84 allow them to rotate freely with respect to the stub axle 86. The two cranked plates 90 are joined by a gusset 94 which extends from the sleeve 92 to a position adjacent the opposite end portions of the plates 90.

Fulcrum arm 88 is coupled to the relevant longitudinal member 30 of the chassis frame by way of a torsion cell generally indicated at 96 (to be more specifically described). Cell 96 is mounted between two plates 98 which are adjustably mounted on two corresponding lugs 100 welded to the chassis frame 22. In FIG. 3, the pivot point of one of the plates 98 to the associated lug 100 is indicated at 102; the pivot is formed by a bolt which passes through both plates and is retained by a nut. A similar pivotal mounting arrangement is provided for the other plate 98, which is not visible in FIG. 3.

The torsion cell 96 comprises inner and outer tubular members 104 and 106 respectively of hexagonal shape. Member 106 extends around member 104 and the intervening space receives a resilient elastomeric material indicated at 108. In this embodiment, the material is a polyester elastomer of a type sold by Dupont of Canada Limited under the Trade Mark HYTREL, although it is of course to be understood that other materials having suitable characteristics may alternatively be used. This particular material has the advantageous characteristics of substantial torsional flexibility and compressive resistence combined with minimum compression set. p Welded to the inner surface of the outer hexagonal member 104 are a series of circular section metal rods 110 which extend over the whole length of the member and which are positioned one between each pair of angularly disposed sides of the hexagon. Similar rods 112 are welded to the external surface of the inner hexagonal member 106 at the positions of the ridges formed between adjacent sides of the hexagon. The elastomeric material is poured into the space between the hexagonal members and is cured in place. The rods 110 and 112 are found not only to assist in mechanically keying the members 104, 106 to the elastomeric material, but also to promote distribution of stresses in the elastomeric material when the cell is subjected to torsion in use as will be more fully explained later.

As can be seen from FIG. 1, the torsion cell 96 is received in and passes through hexagonal openings in the respective plates 98 which form the mounting for the cell. A hexagonal shaft 114 is a close fit in the inner hexagonal member 106 and projects from opposite ends of the cell. Shaft 114 passes through the end plates 90 of the fulcrum arm 88 and is received at each outer end in a hexagonal bush 116 welded to the external surface of the relevant plate 90.

The mounting plates 98 carrying the torsion cell 96 are restrained against pivotal movement with respect to the lugs 108 by an adjusting assembly generally denoted 118. This assembly comprises a screw threaded shaft 120 disposed generally parallel to the plates 98 and attached at its lower end to a transverse sleeve 122 mounted on a shaft 124 which extends between the lugs 100. Slidably mounted on shaft 120 is a sleeve 126 having an upper end which is received in and welded to a transverse bar 128 coupled by pins 130 to the respective plates 98. Lock nuts 132 and 134 are provided on shaft 120 at respectively opposite ends of the sleeve 126 so that the sleeve can be locked in any adjusted position along the length of shaft 120.

It will be appreciated from the foregoing that idler 64 can be adjusted towards and away from ground wheel 68 by releasing the lock nuts 132 and moving them along shaft 120 in the appropriate direction. In this way, the tension in the track can be adjusted. Also, the torsion cell 96 allows the idler 64 to accommodate movement of the track in travelling over obstructions in use. In FIGS. 1 and 2, the track is shown in the normal static condition with the track properly tensioned using the adjustment mechanism 118. In this condition, the torsion cell is subjected to a pre-load due to the tension in the track acting on the idler 64. However, the inherent resiliency of the elastomeric material 118 in the torsion cell allows the idler 64 to move towards and away from ground wheel 68 to compensate for increases or decreases in track tension in use. For example, assume that the vehicle is moving in the forward direction and encounters an obstacle which deflects the leading ground wheel 68 upwardly. This will cause a decrease in tension in the track. By virtue of its pre-load the torsion cell will tend to move the idler 64 upwardly, generally in the direction of arrow A in FIG. 2 in order to compensate for the reduced track tension. When the leading ground wheel 68 has passed over the obstruction, the obstruction will deflect upwardly the portion of the track between ground wheel 68 and 70, producing an increase in tension in the track. Torsion cell 96 will then allow the idler 64 to move downwardly generally in the direction of arrow B in FIG. 2 to compensate for this increase in track tension and the stress in the elastomeric material 118 will increase.

The vehicle shown in the drawings includes a suspension system which employs torsion cells similar to the torsion cell 96 described above in connection with the compensating idler assembly of the track. As can be seen from FIG. 2, each of the road wheels 68, 70 and 72 is supported by a suspension arm having a torsion cell at its upper end. The arms are denoted respectively 136, 138 and 140 and the torsion cells 142, 144 and 146. Each torsion cell is in turn mounted on a torque tube 148, 150 and 152 projecting laterally from the relevant longitudinal chassis member 30.

Reference will now be made to FIG. 4 in describing the suspension components for the road wheel 70. This view may also be considered as representative of the other road wheels.

Torsion cell 144 is the same as torsion cell 96. It includes hexagonal inner and outer members 154, 156 and a body of HYTREL polyester elastomer 158 in a space between members 154 and 156. Two of the cylindrical rods attached to the respective member 154, 156 as described in connection with torsion cell 96 are visible at 160, 162.

As can best be seen in FIG. 1, the outer member 156 of the torsion cell is fitted with plates 164, 166 which are welded to the member in speced parallel positions normal to the longitudinal axis of the member. These plates are in turn bolted to two corresponding lugs 168, 170 welded to the torque tube 150 which projects from the chassis of the vehicle. Accordingly, the outer member of the torsion cell is rigidly held with respect to the longitudinal chassis frame member 30. Torque tube 150 is of hollow cylindrical form and is torsionally flexible within the normal limits of angular twist of a steel-walled tube.

Referring back to FIG. 4, the inner member 154 of torsion cell 144 receives a hardened steel hexagonal shaft 172 which projects from the torsion cell at both ends, where it is coupled to the suspension arm 138 for the wheel 70. Arm 138 is made of two symmetrical steel plates 174, 176 reinforced by gussets 178, 180 welded between the plates. As can be seen from FIG. 4, the upper ends of the plates together define a generally U-shaped configuration and extend to respectively opposite ends of the torsion cell 144. Shaft 172 passes through complimentary hexagonal apertures 182, 184 in the respective plates 174, 176 and through bushes 186, 188 welded to the outer faces of the plates around the hexagonal apertures. The bushes also have hexagonal apertures. Shaft 172 has a head 189 at one end formed by a welded-on collar and has at its opposite end a screw thread which receives a nut 190.

At their lower ends the plates 174, 176 of the suspension arm 138 are welded to a cylindrical sleeve 192 through which extends an axle 194 retained against rotation with respect to the sleeve.

As indicated above, wheel 170 is made up of two similar wheel sections. These sections are denoted 196 and 198 in FIG. 4. Each section is of thin-walled steel construction. The sections include hub assemblies 200, 202 mounted on opposite ends of shaft 194 by way of bearing assemblies 204, 206.

It will be noted that the plates 174, 176 are shaped to define inwardly directed portions 208, 210 just below the torsion cell 144, in the vicinity of the peripheral regions of the wheel sections 196, 198. These portions 208, 210 extend generally normal to the axis of axle 194 in face-to-face contact. As a result of this feature, the suspension arm 138 exhibits a significant degree of lateral flexibility, allowing the wheel sections 196, 198 to move laterally when the track is in use. It has been found that such lateral movement of the road wheels does in fact occur when the vehicle is steered around a curve. Steering is effected in the traditional manner by braking one of the tracks and driving the other track. It is believed that this flexibility of the suspension arms, combined with the resilient or "forgiving" nature of the track itself (see above) contributes significantly to the effeciency of the vehicle as a whole. Further, it is believed that wear on the components of the vehicle and damage to the ground over which the vehicle moves will be reduced compared with conventional vehicles. This concept of flexibility in the suspension components and track is in direct contrast to conventional tracked vehicle designs in which suspension of track components are normally made as rigid as possible.

Referring back to FIG. 2, it will be noted that each of the ground wheel suspension arms 136, 138 and 140 is disposed at an obtuse angle with respect to the forward direction of vehicle movement denoted by the arrow M. In other words, the suspension arms are disposed in a "negative rake" configuration. As a result of this arrangement, upward displacement of any of the ground wheels as the vehicle passes over an obstruction will cause the elastomeric material of the torsion cell associated with that wheel to be subjected to a true torsional stress. For example, referring again to road wheel 70, passage of the track below that wheel over an obstruction will cause the wheel to move upwardly generally in the direction of arrow C in FIG. 2. This will cause the suspension arm 138 to turn about shaft 172, thereby turning the inner torsion cell member 154 and subjecting the elastomeric material of the cell to torsional stress and dissipating the energy of the shock load on the wheel. It will of course be appreciated that the torsion cells associated with the ground wheels will be subjected to a pre-load when the vehicle is in a static condition, due to the weight of the vehicle acting on the wheels through the torsion cells.

This true torsional stressing of the torsion cells contrasts with certain of the prior art torsion cell suspension systems such as that shown in U.S. Pat. No. 2,779,636 referred to above, in which the torsion cells are initially subjected to high compressive rather than to torsional shear loading. This high compressive loading can lead to premature failure of the cells.

Figure 6:
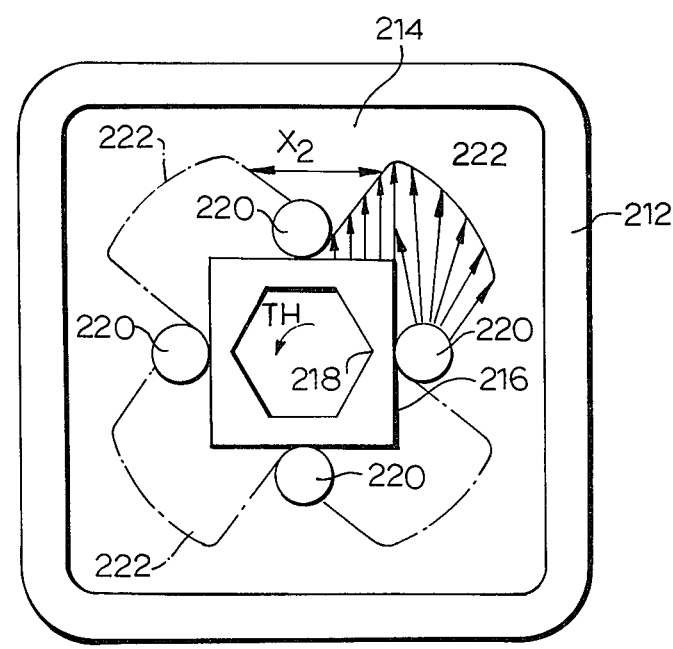
FIG. 6 is an end view of a torsion cell which may be used in the suspension system of FIG. 1 and indicates the stress lines generated in the cell in use.

Reference will now be made to FIG. 6 in describing an alternative form of torsion cell which may be used in the suspension system of the previous Figure. This modified cell will be contrasted with a prior art torsion cell such as that shown, for example, in U.S. Pat. No. 3,545,637.

Referring first to FIG. 6, the torsion cell includes an inner member 210, an outer member 212 and a body 214 of HYTREL polyester elastomer. In this embodiment, the inner member has a square external surface 216 and a hexagonal inner surface 218. The outer member is of generally square shape with somewhat rounded corners. Welded to the external surface 216 of the inner member 210 are four cylindrical rods 220 disposed one on each of the flat exterior faces of the member. Each rod extends longitudinally of member 210 generally centrally of the relevant face.

The arrows denoted 222 in FIG. 6 indicate the stress patterns which are generated in the elastomeric material 214 when the torsion cell is in use. The arrow denoted TM indicates a torsional moment applied to the inner member 210 of the torsion cell. The outer member 212 is stationary. It will be seen that each corner of the inner member 210 generates a compressive stress into the elastomeric material. Also, the rods 220 generate compressive stress forces. As the relative angular movement between the members 210 and 212 increases, the compressive stress forces increase and become a torsional shear stress in the elastomeric material. The stress forces combine to impart a true torsional shear stress to the elastomeric material.

It will be appreciated from the foregoing that the rods 220 tend to promote uniform stress distribution in the elastomeric material, causing the material to act as a true torsional member. The rods serve an additional function in mechanically keying the inner member to the elastomeric material. The rods described above in connection with the torsion cells 96, 142, 144 and 146 will act in similar fashion in those cells. It will of course be appreciated that the rods on the inner surface of the outer member will probably not significantly effect the stress distribution in the elastomeric material but will tend to improve mechanical keying of the elastomeric material to the outer member. Similar rods can accordingly be provided on the inner surface of the outer member of the cell shown in FIG. 6.

Figure 7:
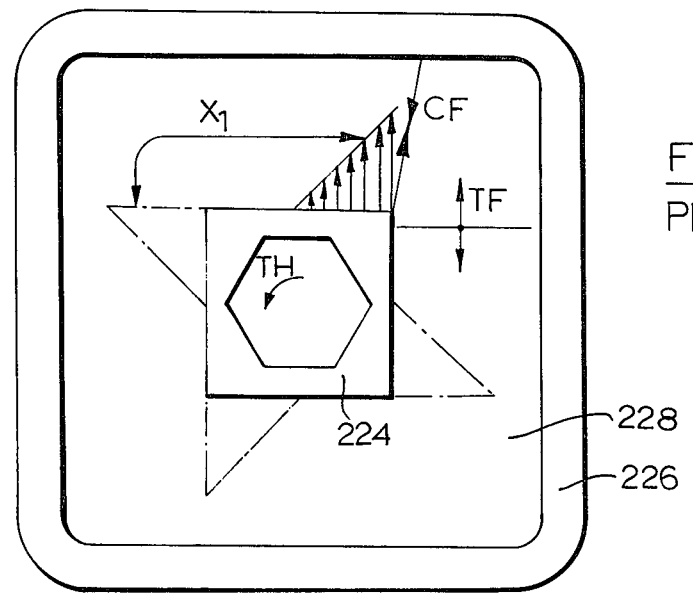
FIG. 7 is a view similar to FIG. 6 of a prior art torsion cell.

By way of contrast with the FIG. 6 embodiments FIG. 7 shows a prior art torsion cell having an inner member 224, an outer member 226 and a body 228 of elastomeric material in the space between the two members. In this cell, it will be noted that the stresses are concentrated in four areas originating from the four corners of the inner members 224. It is found that this stress distribution pattern tends to produce a compression failure of the elastomeric material generally along the line indicated at CF in each corner area of the cell. This is particularly true where the material 228 is a low strength elastomer. At the same time, the compressive forces originating from the corners of member 224 tend to produce tension failures as indicated by the lines denoted TF. This type of failure is particularly predominant where the material 228 is a high strength elastomer. large areas of the elastomeric material (denoted $X_1$) do no useful work. Note that the corresponding area ($X_2$) are much smaller in the cell of FIG. 6.

It should be noted at this stage that although the torsion cell provided by the invention has been described as used in a tracked vehicle, the cell may be used in other environments, eg. in automotive applications.

It should also be noted that the preceding description applied to specific embodiments and that many modifications are possible. For example, referring to the suspension system, the ground wheels could be mounted on cantilever axles. Also, it is not essential to employ a chassis frame to which the suspension components are fitted as described above. For example, the suspension components could be attached directly to a base frame or other form of chassis.

The compensating idler adjusting assembly (reference 118) of each track assembly is described above as including an adjusting screw. In an alternative embodiment, a hydraulic adjusting assembly may be used. This form of adjusting assembly may employ an extendable grease cylinder or jack which is stroked (actuated) by either releasing an internal grease charge or by adding additional grease from a grease pressure gun.

Referring to the torsion cell, it will be appreciated that the shapes of the inner and outer members of the cell may vary and that the examples specifically described above are not exhaustive. The inner and outer members of a particular cell need not be the same shape. Also, the number, arrangement and shape of the elongate elements on the outer surface of the inner member of the cell may vary. It is believed that circular section elements may be preferred because they tend to produce smooth stress distribution patterns although other shapes may be satisfactory. Further, these elements may be initially separate from the inner member of the cell and attached, eg. by welding, or may be formed integrally with the member. The inner cell member need not be tubular. External components could, for example, be attached directly to the ends of a solid inner cell member.

What I claim as my invention is:

1. A tracked vehicle comprising:
   a chassis supporting a power unit;
   two track assemblies disposed at respectively opposite sides of said chassis and each including: an endless track; means for guiding the track in a closed path including a lower portion along which the track runs in contact with the ground; means drivably coupling the power unit and the track for driving the track in said path to propel the vehicle in use; and a plurality of ground wheels rotatable about axes normal to the forward direction of vehicle movement and arranged in rolling contact with the track along said ground-contacting portion of its path; and
   a suspension system comprising:
      in association with each of said track assemblies, a plurality of suspension arms, each rotatably supporting one of said ground wheels; and
      a corresponding plurality of torsion cells, each coupling one of said arms to said chassis; each torsion cell comprising: an inner member having an outer surface which is of non-circular shape and which extends about a longitudinal axis of the member; an outer tubular member having an inner surface which is of non-circular shape and which extends about said longitudinal axis, said outer member extending around said inner member to define a space between said members; a resilient elastomeric material disposed in said space and torsionally coupling said members; and a plurality of elongate elements extending longitudinally of and spaced equally about said outer surface of the inner member of the cell to mechanically key the inner member to said elastomeric material and provide, on said inner member, spaced stress-distribution surfaces tending to equalize throughout the elastomeric material, stresses produced in said material in response to relative turning movement between said inner and outer members when the cell is in use;
      each said torsion cell being coupled to the chassis of the vehicle by one of its said inner and outer members so that the longitudinal axis of the cell extends parallel to the axis of rotation of the associated wheel and the other member of each cell being coupled to the relevant wheel suspension arm so that said arm defines an obtuse angle with respect to the direction of vehicle movement, whereby vertical travels over obstructions in use causes relative turning movement between said inner and outer members of the associated torsion cells and torsionally stresses the elastomeric material of the cell.

2. A vehicle as claimed in claim 1, wherein said suspension sustem further comprises torque tubes projecting laterally from said chassis and having outer end portions, and wherein each said torsion cell coupling one of said suspension arms to said chassis is mounted on the outer end portion of one of said torque tubes by way of the relevant tubular member of the torsion cell, whereby movement of a ground wheel tending to stress an associated torsion cell will also tend to torsionally deflect the associated torque tube.

3. A vehicle as claimed in claim 2, wherein said inner member of the cell is of tubular form and wherein the suspension system further comprises, in association with each torsion cell, a pair of mounting plates coupling the cell to the associated torque tube, the plates being disposed in spaced parallel positions longitudinally of the cell and the outer tubular member of the cell being rigidly coupled to said plate, and a shaft which extends through said inner tubular member of the cell and is coupled to said member in non-rotational fashion and to said suspension arm, whereby angular movement of said arm turns said inner member with respect to the outer member and stresses the elastomeric material of the cell.

4. A vehicle as claimed in claim 2, wherein said chassis comprises a frame which is designed to support said power unit, and which includes parallel longitudinal members, and wherein said torque tubes project laterally from said longitudinal members.

5. A vehicle as claimed in claim 1, wherein each of said suspension arms is designed to be laterally flexible to allow limited lateral movement of the associated road wheel.

6. A vehicle as claimed in claim 5, wherein each said endless track of the vehicle comprises:
   a plurality of track elements pivotally coupled together for movement about parallel pivot axis extending transversely of the track, said track elements including:
      a row of guiding elements extending longitudinally of the track generally centrally thereof, said elements being adapted to locate the track laterally in use; and
      resiliently flexible traction elements arranged in parallel rows symmetrically on opposite sides of said guiding elements;
   and wherein each said ground wheel of the vehicle comprises two similar wheel sections rotatable about a common axis and spaced laterally of the track to accommodate therebetween said row of guiding elements;
   and wherein each said suspension arm extends between the two sections of the associated ground wheel and includes two symmetrical plates coupled together and shaped to define, intermediate opposite ends of the arm, portions which are directed inwardly laterally of the vehicle and which impart said lateral flexibility to the arm.

7. A vehicle as claimed in claim 1, wherein each said track assembly further includes a compensating idler for maintaining tension in the relevant track, said idler including: an idler wheel which is rotatable about an axis normal to the direction of vehicle movement and which is arranged in contact with the track at a position in advance of said lower portion of the track; a fulcrum arm rotatably supporting said idler wheel; a torsion cell coupled to said arm; and means mounting said torsion cell on said chassis of the vehicle;

said torsion cell comprising: an inner member having an outer surface which is of non-circular shape and which extending about a longitudinal axis of the member; an outer tubular member having an inner surface which is of non-circular shape and which extends about said longitudinal axis, said outer member extending around said inner member to define a space between said members; a resilient elastomeric material disposed in said space and torsionally coupling said members; and, a plurality of elongate elements extending longitudinally of and spaced equally about said outer surface of the inner member of the cell to mechanically key the inner member to said elastomeric material and provide, on said inner member, spaced stress-distribution surfaces tending to equalize throughout the elastomeric material, stresses produced in said material in response to relative turning movement between said inner and outer members when the cell is in use;

said torsion cell being coupled to said mounting means by one of its inner member and outer member so that the longitudinal axis of the cell extends parallel to the axis of rotation of said idler wheel, and the other member of the cell being coupled to said fulcrum arm so that displacement of the idler wheel in response to changes in track tension causes relative turning movement between said inner and outer members of the torsion cell;

said mounting means being adjustable to vary the static position of the idler wheel and thereby to adjust track tension.

8. In a tracked vehicle comprising: a chassis supporting a power unit; two track assemblies disposed at respectively opposite sides of said chassis and each including an endless track, means for guiding the track in a closed path including a lower portion along which the track runs in contact with the ground; means drivably coupling the power unit and the track for driving the track in said path to propel the vehicle in use, and a plurality of ground wheels rotatable about an axis normal to the direction of vehicle movement and arranged in rolling contact with the track along said ground-contacting portion of its path; and, a suspension system for said ground wheels;

the improvement wherein said suspension system comprises:

in association with each of said track assemblies, a plurality of suspension arms, each rotatably supporting one of said ground wheels; and a corresponding plurality of torsion cells, each coupling one of said arms to said chassis; each torsion cells comprising: an inner member having an outer surface which is of non-circular shape and which extends about a longitudinal axis of the member; an outer tubular member having an inner surface which is of non-circular shape and which extends about said longitudinal axis, said outer member extending around said inner member to define a space between said members; a resilient elastomeric material disposed in said space and torsionally coupling said members; and a plurality of elongate elements extending longitudinally of and spaced equally about said outer surface of the inner member of the cell to mechanically key the inner member to said elastomeric material and provide, on said inner member, spaced stress-distribution surfaces tending to equalize throughout the elastomeric material, stresses produced in said material in response to relative turning movement between said inner and outer members when the cell is in use;

each said torsion cell being coupled to the chassis of the vehicle by one of its said inner and outer members so that the longitudinal axis of the cell extends parallel to the axis of rotation of the associated wheel and the other member of each cell being coupled to the relevant wheel suspension arm so that said arm defines an obtuse angle with respect to the direction of vehicle movement, whereby vertical displacement of a ground wheel as the vehicle travels over obstructions in use causes relative turning movement between said inner and outer members of the associated torsion cells and torsionally stresses the elastomeric material of the cell.

9. A torsion cell comprising: an inner member having an outer surface which is of non-circular shape and which extends about a longitudinal axis of the member; an outer tubular member having an inner surface which is of non-circular shape and which extends about said longitudinal axis, said outer member extending around said inner member to define a space between said members; a resilient elastomeric material disposed in said space and torsionally coupling said members; and, a plurality of elongate elements extending longitudinally of and spaced equally about said outer surface of the inner member of the cell to mechanically key the inner member to said elastomeric material and provide, on said inner member, spaced stress-distribution surfaces tending to equalize throughout the elastomeric material, stresses produced in said material in response to relative turning movement between said inner and outer members when the cell is in use.

10. A torsion cell as claimed in claim 9, wherein said inner surface of the outer tubular member is of generally square shape in transverse cross-section; and wherein the outer surface of the inner member is of generally square shape in transverse cross-section defining four similar flat surface portions; and wherein the cell includes four of said elongate elements, each of which is of substantially circular shape in transverse cross-section and extends longitudinally of one of said flat surface portions of said inner member generally centrally of the width of said portion.

* * * * *